United States Patent [19]

Rees et al.

[11] 4,415,258
[45] Nov. 15, 1983

[54] LINEAR LENS ARRAY IMAGING SYSTEM FOR FORMING REDUCED OR ENLARGED IMAGES AT AN IMAGE PLANE

[75] Inventors: James D. Rees, Pittsford; John A. Durbin, Webster, both of N.Y.

[73] Assignee: Xerox Corporation, Stamford, Conn.

[21] Appl. No.: 373,462

[22] Filed: Apr. 30, 1982

[51] Int. Cl.³ .............................................. G03G 15/28
[52] U.S. Cl. .............................................. 355/8; 355/55
[58] Field of Search ..................... 355/8, 3 R, 55, 60, 355/56, 57, 11, 66, 1

[56] References Cited

U.S. PATENT DOCUMENTS

| | | | |
|---|---|---|---|
| 3,544,190 | 12/1970 | Moorhusen et al. | 350/6 |
| 3,687,545 | 8/1972 | Moorhusen | 355/8 X |
| 3,754,822 | 8/1973 | Melrose | 355/8 |
| 3,884,574 | 5/1975 | Doi et al. | 355/8 X |
| 3,914,044 | 10/1975 | Ogawa | 355/8 |
| 3,947,106 | 3/1976 | Hamaguchi et al. | 355/1 |
| 3,977,777 | 8/1976 | Tanaka et al. | 355/1 |
| 4,129,373 | 12/1978 | Ogura et al. | 355/1 |
| 4,351,605 | 9/1982 | Carpenter | 355/8 |

FOREIGN PATENT DOCUMENTS

| | | |
|---|---|---|
| 40548 | 11/1981 | European Pat. Off. . |
| 53-97436 | 8/1978 | Japan . |
| 55-1206 | 1/1980 | Japan . |
| 55-52074 | 4/1980 | Japan . |

Primary Examiner—R. L. Moses

[57] ABSTRACT

An imaging system is disclosed which employs a lens array positioned to transmit reflected images from a document in an object plane onto an imaging plane at a reduction or enlargement value. The document, lens array and imaging plane are moved with respect to each other within certain prescribed and preferred velocity ratios.

7 Claims, 4 Drawing Figures

LINEAR LENS ARRAY IMAGING SYSTEM FOR FORMING REDUCED OR ENLARGED IMAGES AT AN IMAGE PLANE

BACKGROUND AND PRIOR ART STATEMENT

The present invention relates to an imaging system which utilizes a linear lens array in an optical system to transmit an image of a document at an object plane to an image plane at a reduction or enlargement value. More particularly, the invention relates to an imaging system which utilizes a moving document, a moving imaging assembly and a moving photoreceptor belt in a unique set of velocity relationships.

Document reproduction system utilizing linear lens array imaging ystems are known to the art in two principal embodiments. U.S. Pat. No. 3,544,190 is representative of these systems which utilize a linear stacked array of lenslets known as "strip lenses". U.S. Pat. No. 3,977,777 is representative of those scanning systems utilizing a scanning lens array comprising bundled gradient index optical fibers. Both of these imaging systems are desirable for use, for example, in document reproduction machines because they transmit an erect image to an imaging plane, have a short total conjugate and greatly reduce the mass and expense associated with the conventional lens, multi-mirror scan systems. Gradient index lens arrays have especially found wide acceptance as replacements for conventional image transmitting components in copiers as disclosed, for example, in U.S. Pat. Nos. 3,947,106 and 3,977,777. Each of these prior art copiers uses a single gradient index lens array to transmit images at a magnification of 1:1. And each of these imaging systems utilizes a fixed lens system, scanning being accomplished by moving the document past the lens in conjunction with a similar motion of a photoconductive imaging plane.

These systems, which can be characterized as moving platen or, more accurately, moving document systems, impose constraints on equipment size since the platen must travel the width of a document during the scan cycle.

Other scanning systems are known which accomplish the scanning function by moving a linear lens array beneath a fixed document. Illustrative of such systems are the scanning systems disclosed in U.S. Pat. No. 4,129,373 and Japanese Publication No. 55-1206.

A third system is known wherein the document, photoconductive imaging plane and linear lens array all move at speeds bearing a certain relationship to each other. This type of system, as disclosed in Japanese Publications 53-97436, 55-52074 and U.S. Pat. no. 3,754,822 have the desirable characteristics of compactness coupled with increases in copy rate for a given process speed.

All of the above-disclosed systems are related to imaging systems which transmit images at unity (1X) magnification. An imaging system using a linear lens array in a multi-magnification mode system is disclosed in copending U.S. Application No. 151,994, published as European Publication No. 0040548 on Nov. 25, 1981, assigned to the same assignee as the present invention. In this application various reproduction systems are disclosed which utilize a gradient index lens array as the imaging device. One embodiment disclose a lens assembly consisting of a 1X array coupled with a reduction/enlargement lens array, the latter constructed according to the principles disclosed in said application. This system utilizes a moving platen and fixed lens array, the platen to photoreceptor speed changing during magnification changes to maintain proper image exposure at the photoreceptor. The present invention is directed to modification of this sytem wherein the document, photoreceptor and lens array assembly are all moving in uniquely defined relationships during a reduction or enlargement mode of operation. More specifically, the invention is directed to an imaging system for projecting an erect image of a document lying in an object plane onto a photoreceptor lying in an image plane parallel to said object plane at at least one magnification m other than unity, said system including:

an imaging assembly positioned between said object plane and photoreceptor, first drive means for driving said photoreceptor at a first velocity v, second drive means for driving said document at a second velocity v', and third drive means for driving said imaging assembly at a third velocity v", said first, second and third velocities being related by the expression $$v' = \frac{v}{m} + v'' \frac{(1-m)}{m}$$

DRAWINGS

DESCRIPTION

Figure 1:
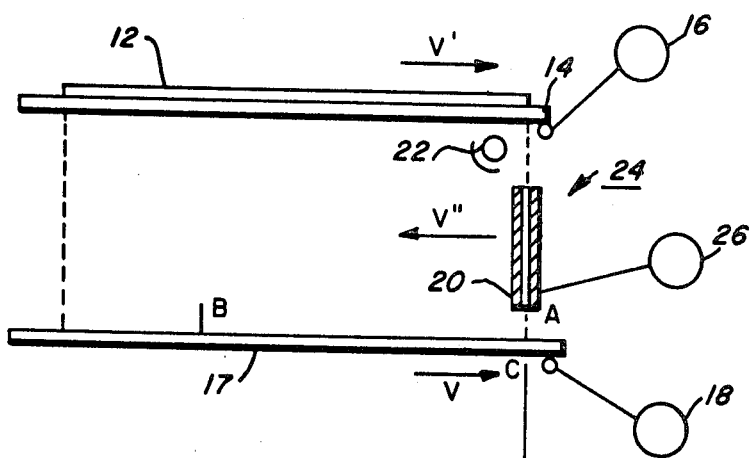
FIG. 1 is a side schematic view of an optical scanning system at a start-of-scan position, wherein a document platen, reduction linear lens array and photoconductor are movable with respect to each other.

FIG. 1 illustrates, in side view schematic, an optical system which utilizes a moving linear gradient index lens array to project a reduced image of a document moving through a scanning zone onto the surface of a moving photoreceptor. The system is shown at a start-of-scan position.

Referring to FIG. 1, a document 12 is shown, on a platen 14 which is movable along a horizontal plane during scanning operation by operation of a suitable drive means such as reversible drive motor 16. The movement during scanning is in the direction indicated by the solid arrow. A flat portion 17 of an endless loop photoreceptor belt lies in a plane which is parallel to that traversed by the platen. Belt 17 is continually driven by a suitable drive means such as motor 18, in the direction shown by the solid arrow during a scanning operation.

A reduction gradient index array 20 is positioned, in generally perpendicular orientation, between platen 14 and belt 17. Design details for construction of lens array 20 are provided in U.S. Application No. 151,994, whose contents are hereby incorporated by reference. Attached to array 20 is an elongated lamp/reflector combination 22 which is adapted to provide a narrow, longitudinally extending, illumination strip along the bottom of platen 14. Lens array 20 and lamp/reflector combination 22 together form an imaging assembly 24. Assembly 24 is moved during scanning, in the direction shown by the arrow, by any suitable drive means such as reversible motor 26.

For purposes of the following discussion, the scanning rates of movement, or velocities, of the various moving components during a document scan operation are identified as follows:

photoreceptor velocity = v
platen 14 (document 12) velocity = v'
imaging assembly velocity = V''

The general principle applicable to any document imaging system is that, to obtain properly focused, blur-free imaging, the velocity of the image being transmitted to the photoreceptor must be synchronized to the velocity of the photoreceptor. For the system of FIG. 1, this principle requires consideration of the object, image and photoreceptor velocities with regard to the imaging assembly velocity.

To maintain the necessary image-to-photoreceptor velocity ratio, $$v' = \frac{v}{m} + \frac{v''(1-m)}{m} \quad (1)$$

Equation (1) provides the general conditions for determining the necessary velocity relationships which will enable the FIG. 1 system. With a document of width w on the platen, the exposure velocity is $v+v''$, the image width at the photoreceptor is mw and the exposure time is $$\frac{mw}{v+v''}.$$

Then the necessary platen, lens, and photoreceptor displacements are defined by the following equations.

$$\text{Platen displacement} = \frac{v}{m} + \frac{v''(1-m)}{m} \cdot \frac{mw}{v+v''} = w - \frac{mv''w}{v+v''} \quad (2)$$

$$\text{Imaging assembly displacement} = \frac{mv''w}{v+v''} \quad (3)$$

and $$\text{Photoreceptor displacement} = \frac{mvw}{v+v''} \quad (4)$$

From the above equations, the sum of the platen displacement and the lens displacement equals the document width w for any value of imaging assembly velocity v'', photoreceptor velocity v or platen velocity v'. Also, the imaging assembly displacement plus the photoreceptor displacement equals the image width mw for any value of v, v' or v''.

The derivations of the above equations permit a system designer the necessity insights into designing a smear-free imaging system. There are, however, some velocity relationships which are preferred because of the ease of obtaining them through the particular drive system to be employed.

The simplest solution is to drive both the platen and imaging assembly at the same velocity; i.e. make v' equal to v''. Solving Equation (1) for these conditions, $$v'' = \frac{v}{2m-1} \text{ or } v = v''(2m-1), \text{ for } v' = v''. \quad (5)$$

Figure 2:
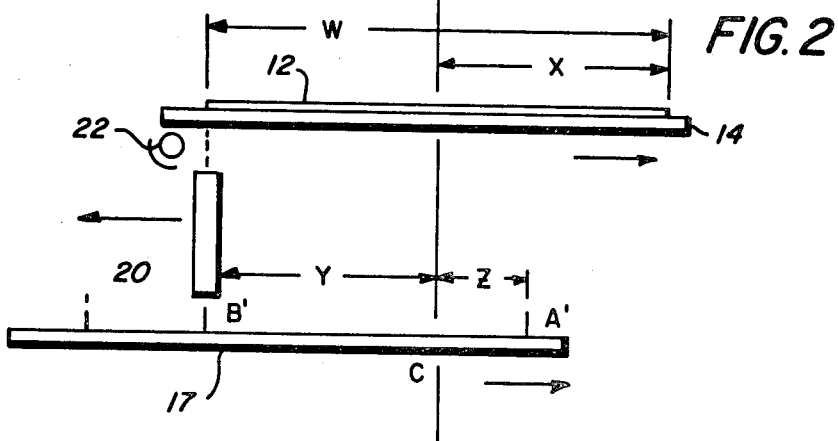
FIG. 2 shows a side schematic view of the optical scanning system of FIG. 1 at an end-of-scan position wherein the document platen and lens array have moved in opposing directions at the same velocity.

FIG. 2 shows the FIG. 1 system at an end-of-scan position with m=0.707× and v'=v''. Platen 14 and the imaging assembly 24 are moved from the start-of-scan position in FIG. 1 to an end-of-scan position shown at velocities v''=v'. Platen 14 is displaced a distance x which is equal to a lens displacement distance y. Both x and y=w/2. The total displacements (x+y) must therefore equal the width w of document 12. Photoreceptor 17 moves at a velocity v determined by Equation (5) to point A' for a displacement of z. Point B represents the end of the reduced image area. The sum of the lens displacement (y) plus the photoreceptor displacement (z) must equal the image width mw (distance from A to B). FIG. 2 also illustrates an additional advantage of the present invention. As shown, imaging assembly 24 has moved during scan, in a direction opposite to the direction of belt 17. The image has thus been advanced along the photoreceptor until it reaches the end-of-scan position B'. The photoreceptor must now travel for some finite amount of time t until point B' arrives at point C representing the start-of-scan position, i.e. t=B'C/v. During this time interval t, platen 14 and assembly 24 can easily be driven by their respective motors 16, 26 back to the start-of-scan positions. The next image can thus be formed on photoreceptor 17 with little or no inter-image separation thereby increasing process throughput. The time t can also be used to replace document 12 with another document.

A second desirable lens-platen velocity relationship is to drive the lens at one half the platen speed; i.e. make $$v'' = \frac{v'}{2}.$$

Solving equation (1) for this condition:

$$v'' = \frac{v}{3m-1} \text{ or } v = v''(3m-1) \text{ for } v'' = \frac{v'}{2} \quad (6)$$

Figure 3:
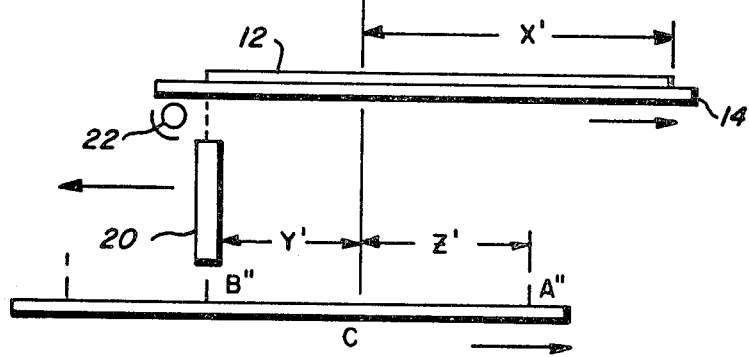
FIG. 3 shows a side schematic view of the optical scanning system of FIG. 1 at an end-of-scan position wherein the document platen and lens array have moved in opposing directions, the lens velocity being ½ the platen velocity.

FIG. 3 shows the FIG. 1 system at end-of-scan position for a m=0.707x and v''=v'/2. Platen 14 and imaging assembly 24 are moved from their start of scan position to the end-of-scan position shown at velocities v''=(v')/(2). Platen 14 is displaced a distance x' which is twice the displacement of lens displacement y', i.e. y'=w/3 and x'=2w/3. Total displacement of x'+y' must still equal w. Photoreceptor 17 moves at a velocity determined by equation (6) to point A'' for a displacement z'. The sum of the lens displacement y' plus the photoreceptor displacement z' equals mw (0.707w).

The velocities and displacements are to be determined for enlargement modes of operation using the principles set forth above.

The above description discloses a scanning system in which all interactive components, e.g. document, imaging assembly and photoreceptor, were moving at the prescribed relationships.

A special case exists in which these relationships are still valid even though one of the components (the platen) is held stationary. For this special case, the photoreceptor velocity v is then related, from equation (1), to the magnification m and the velocity of the scanning assembly v'' by the following expression:

$$v = v''(m-1), \text{ for } v' = 0 \quad (7)$$

Again, with a document of width w placed on the platen, the exposure velocity is $v + v'' = mv''$ from Equation (7). The image width at the photoreceptor is mw and the exposure time is $$\frac{mw}{mv''} = \frac{w}{v''}.$$

Then, the necessary platen, imaging assembly and photoreceptor displacements are defined as follows: Platen displacement equals zero; from equation (3), imaging assembly displacement equals w and, from equation (4) photoreceptor displacement equals $(m-1)w$.

Figure 4:
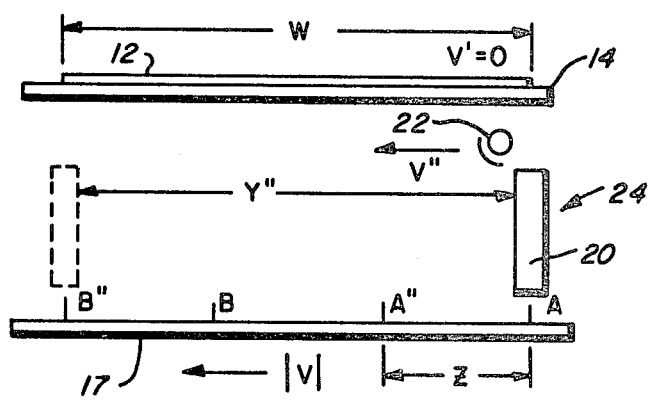
FIG. 4 shows a side schematic view of a special case of FIG. 1 wherein the document platen is fixed.

Referring to FIG. 4, there is shown a scanning system in which document 12 of width w is placed on stationary platen 14. A photoreceptor belt 17 is continually driven in the direction shown. Imaging assembly 24 is moved, during scanning, in a direction determined by the magnification factor m.

For reduction values of $m < 1$ from equation (7), v will be negative; i.e. the photoreceptor will travel in the opposite direction to that shown in FIGS. 1-3. FIG. 4 shows the lens and photoreceptor at the beginning and end-of-scan positions for a 0.707 reduction. At the beginning-of-scan, imaging assembly 24 is at the solid line position projecting the right hand edge of the document onto point A of belt 17. By equation (7)

$$|v''| = \left|\frac{v}{(m-1)}\right| 3.413 \, v.$$

Imaging assembly 24 scans the full width of the document to the dotted position so the assembly 24 displacement value y'' is equal to w. Point A on the photoreceptor is displaced a distance of $|(m-1)w|$, or 0.293 w to point A''. The reduced image is therefore projected onto belt 17 between points A'' B''.

For an enlarged image, either the imaging assembly or the photoreceptor must reverse direction. Since it is usually quite difficult to provide for a 2 way belt travel, the direction of assembly 24 would be reversed and the assembly would be moved at a velocity determined by Equation (7). Thus, the start-and-end-of-scan position shown in FIG. 4 will be reversed.

EXAMPLES

Table 1 lists the characteristics for an exemplary imaging system utilizing the moving platen mode described with reference to FIGS. 1, 2 and 3. A process (photoreceptor) speed of 7 inches/sec. is assumed. The values shown do not include the effects of the slit width (i.e. width w is slightly larger than the width of the document to be copied so as to take into account the typical 2-3 mm slit width) nor the small displacements required for acceleration and deceleration.

TABLE I

| | | |
|---|---|---|
| Magnification (m) | 0.647 | 1.546 |
| Object Width (w) (inches) | 17.0 | 11.0 |
| Photoreceptor (process) Speed (v) (in/sec) | 7.0 | 7.0 |
| Imaging Assembly Speed (v'') (in/sec) | 7.44 | 3.35 |
| Platen Speed (v') (in/sec) | 14.88 | 3.35 |
| v''/v' | 0.5 | 1.0 |
| Exposure Speed (in/sec) | 14.44 | 10.35 |
| Exposure Time (sec) | 0.76 | 1.64 |
| Platen Displacement (in) | 11.33 | 5.50 |
| Lens Displacement (in) | 5.67 | 5.50 |
| Photoreceptor Displacement (in) | 5.33 | 11.50 |

Other variations of the embodiments may be made consistent with the principles of the invention. For example, while the described embodiments have utilized gradient index lens arrays as the imaging members, the principles of the invention are applicable to other imaging transmitters such as lens strips, or any imaging system which projects erect images onto a photosensitive plane.

Also, it may be pointed out that, while the imaging assembly 24 in the disclosed embodiments provide a reduction of the image, reversal of the assembly orientation consistent with the principles of the aforesaid Application 151,994 provide an enlarged image at the photoreceptor.

What is claimed is:

1. An imaging system for projecting an erect image of a document lying in an object plane onto a photoreceptor lying in an image plane parallel to said object plane at at least one magnification m other than unity, said system including:
   an imaging assembly positioned between said object plane and photoreceptor,
   first drive means for driving said photoreceptor at a first velocity v,
   second drive means for driving said document at a second velocity v', and
   third drive means for driving said imaging assembly at a third velocity v'', said first, second and third velocities being related by the expression $$v' = \frac{v}{m} + v'' \frac{(1-m)}{m}$$

2. The imaging system of claim 1 wherein said document and photoreceptor are driven in a first direction and said imaging assembly is driven in a second direction.

3. The imaging system of claim 2 wherein $|v'-'| = |v'|$.

4. The imaging system of claim 2 wherein $|v'-'| = |(v'/2)|$.

5. The imaging system of claim 1 wherein $v' = 0$ and $m < 1$ and wherein said imaging assembly is moved in the same direction as said photoreceptor at a velocity $$v'' = \frac{v}{m-1}.$$

6. The imaging system of claim 5 wherein $m > 1$ and wherein said imaging assembly direction is reversed.

7. The imaging system of claim 6 wherein the photoreceptor direction is reversed.

* * * * *